(12) United States Patent
Carmody et al.

(10) Patent No.: US 11,879,410 B2
(45) Date of Patent: Jan. 23, 2024

(54) METAL-STABILIZED PROPELLANT GRAIN FOR GUN-FIRED ROCKET MOTOR, AND ROCKET MOTOR BAFFLED END CAP FOR RELIABLE GUNFIRE

(71) Applicant: Raytheon Company, Waltham, MA (US)

(72) Inventors: Joseph A. Carmody, Tucson, AZ (US); Benjamin C. Hulbert, Tucson, AZ (US); Ryan J. Paffenroth, Tucson, AZ (US); Andrew J. Harris, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/184,470

(22) Filed: Feb. 24, 2021

(65) Prior Publication Data
US 2022/0025835 A1    Jan. 27, 2022

Related U.S. Application Data

(60) Provisional application No. 63/025,265, filed on May 15, 2020.

(51) Int. Cl.
*F02K 9/32* (2006.01)
*F02K 9/26* (2006.01)
(Continued)

(52) U.S. Cl.
CPC ............... *F02K 9/32* (2013.01); *F02K 9/26* (2013.01); *F02K 9/978* (2013.01); *F42B 5/10* (2013.01);
(Continued)

(58) Field of Classification Search
CPC ..... F02K 9/10; F02K 9/16; F02K 9/36; F02K 9/97; F42B 5/10; F42B 5/105; F42B 14/00; F42B 15/00; F41F 3/052
(Continued)

(56) References Cited

U.S. PATENT DOCUMENTS 3,226,928 A * 1/1966 Jackson ............... F02K 9/16
60/253
3,316,718 A   5/1967 Webb
(Continued)

FOREIGN PATENT DOCUMENTS

DE    1703407        1/1972
DE    1703407 A1 *  1/1972  ............. F42B 10/14

OTHER PUBLICATIONS

International Search Report and Written Opinion dated Jun. 21, 2021 in corresponding International Application No. PCT/US2021/023832.

*Primary Examiner* — Kyle Robert Thomas
(74) *Attorney, Agent, or Firm* — Renner, Otto, Boisselle, & Sklar LLP

(57) ABSTRACT

A rocket motor for a gun-fired projectile is configured stiffen the burnable propellant in the rocket motor during burning and/or protect the rocket motor from the pressure that occurs during firing of the projectile from the gun. The rocket motor may include a rigid structure that is integrated into the burnable propellant grain to stabilize the burnable propellant grain during burning of the burnable propellant grain. The rigid structure has a matrix or truss-like shape that extends into the depth of the burnable propellant grain. The rocket motor may include a baffled end cap that covers a nozzle of the rocket motor. The end cap defines a baffled path through the end cap to dampen gas flow into the nozzle and prevent particles of the gun propellant from entering the rocket (Continued)

motor. A rocket motor may implement the rigid structure or the baffled end cap, or both structures.

15 Claims, 5 Drawing Sheets

(51) Int. Cl.
*F42B 15/10* (2006.01)
*F42B 5/10* (2006.01)
*F42B 15/00* (2006.01)
*F02K 9/97* (2006.01)
*F42B 14/00* (2006.01)

(52) U.S. Cl.
CPC .............. *F42B 5/105* (2013.01); *F42B 14/00* (2013.01); *F42B 15/00* (2013.01); *F42B 15/10* (2013.01)

(58) Field of Classification Search
USPC ........................................ 102/374, 376, 380
See application file for complete search history.

(56) References Cited

U.S. PATENT DOCUMENTS

| | | | | |
|---|---|---|---|---|
| 3,380,382 A | * | 4/1968 | Jablansky | F42B 10/14 244/3.28 |
| 3,698,321 A | | 10/1972 | Wall | |
| 3,750,979 A | * | 8/1973 | Nelms | F42B 5/10 244/3.24 |
| 4,146,180 A | * | 3/1979 | Dettling | F02K 9/978 277/917 |
| 4,574,702 A | * | 3/1986 | Brandt | F42C 15/34 102/272 |
| 4,756,251 A | * | 7/1988 | Hightower, Jr. | C06B 45/00 102/289 |
| 4,756,252 A | * | 7/1988 | Melhus | F42B 10/40 102/374 |
| 5,127,223 A | * | 7/1992 | Hightower, Jr. | F02K 9/10 60/253 |
| 6,272,997 B1 | * | 8/2001 | James | F41F 3/052 102/293 |
| 6,369,373 B1 | * | 4/2002 | Tepera | F42B 14/00 244/3.3 |
| 2010/0288150 A1 | * | 11/2010 | Kautto | F41F 3/052 102/293 |

* cited by examiner

US 11,879,410 B2

METAL-STABILIZED PROPELLANT GRAIN FOR GUN-FIRED ROCKET MOTOR, AND ROCKET MOTOR BAFFLED END CAP FOR RELIABLE GUNFIRE

RELATED APPLICATIONS

This application claims the benefit of U.S. Provisional Application No. 63/025,265 filed May 15, 2020, which is hereby incorporated herein by reference in its entirety.

GOVERNMENT LICENSE RIGHTS

This disclosure was made with Government support under contract number HR0011-15-C-0081, awarded by the Department of Defense. The Government has certain rights in the disclosure.

FIELD OF DISCLOSURE

The disclosure relates to rocket motors for gun-fired projectiles.

DESCRIPTION OF RELATED ART

Various applications require projectiles or payloads that are launched from a mission suitable platform, such as a land, sea, air, or space vehicle, or stationary platform. The payload to be launched is dependent on the application. Military applications may use deployable munitions or projectiles which are launched by a gun or cannon. The projectile may be attached to a rocket motor that provides additional propulsion after the projectile is fired from the gun. The rocket motor includes a burnable propellant grain that is ignited during or after the gun powder or propellant is burned. The burnable propellant grain of the rocket motor may be ignited by the gas generated during burning of the gun propellant.

The burnable propellant grain of the rocket motor may be formed of a flexible or semi-rigid material, such as polyurethane. A deficiency of conventional gun-fired rocket motors is that when subject to the acceleration of the gun, e.g. approximately 15,000 g's, the semi-rigid material of the burnable propellant may move toward an aft end of the projectile and the attached rocket motor due to the inertia caused by the projectile and rocket motor moving forward through the gun. Consequently, stress and strain may occur in the rocket motor propellant that leads to fracture and unplanned burning along the additional surface area created by the fracture.

Still another deficiency of conventional gun-fired rocket motors is that gun dynamic pressure may induce damaging shock to the rocket motor and particles of the gun propellant may pass through a nozzle of the rocket motor. Either the damaging shock or the particles may damage the rocket motor. Consequently, the rocket motor may be subject to failure. Prior attempts to protect the rocket motor include using blast tubes that are arranged inside of the rocket motor propellant grain or completely closed caps. However, the prior attempts are deficient in that they require implementing a separate motor ignition device for igniting the rocket motor propellant grain, such that manufacturing the rocket motor is more complex and costly.

SUMMARY OF DISCLOSURE

The present application provides a rocket motor for a gun-fired projectile that is configured to at least one of stiffen the burnable propellant in the rocket motor during burning and protect the rocket motor from the pressure that occurs during firing of the projectile from the gun. The rocket motor may include a rigid structure that is integrated into the burnable propellant grain to stabilize the burnable propellant grain during pressurization and acceleration of a gunfire event. The rigid structure has a matrix or truss-like shape that extends into the depth of the burnable propellant grain while enabling the grain face to be exposed to gun gas for ignition of the burnable propellant.

The rocket motor may include a baffled end cap that covers a nozzle of the rocket motor that is fluidly connected between the rocket motor and a chamber of the gun-fired projectile that contains another propellant. The end cap defines a baffled path through the end cap to dampen gas flow into the nozzle and prevent particles of the gun propellant from entering the rocket motor. An exemplary rocket motor may implement the rigid structure or the baffled end cap, or both the rigid structure and the baffled end cap.

The rigid structure may be retained during burning of the rocket motor propellant or ablated during burning. If the rigid structure is to be retained, the rigid structure may be formed of a durable metal having a high melting point or any other material that will not burn. If the rigid structure is to be ablated during burning of the rocket motor propellant, the rigid structure may be formed of a material having a burn rate that is similar or nearly similar to the burn rate of the burnable propellant. The rigid structure may have a symmetrical pattern and may be co-molded, casted, or entrained in any suitable way into the rocket motor.

The baffled path through the end cap may have a torturous or serpentine shape that prevents a straight-line path through the throat of the rocket motor nozzle. The end cap may be removably attached to a component in a gun-fired projectile assembly, such as to the projectile or to an ignitor in a cartridge case that contains the gun propellant. Flexible tabs may be formed on the end cap to engage the component and deflect during firing of the projectile such that the end cap is discarded from the assembly. Alternatively, the end cap may be retained in the cartridge case after firing the projectile.

According to an aspect of the disclosure, a rocket motor may include a rigid stabilizing structure integrated into a burnable propellant grain.

According to an aspect of the disclosure, a rocket motor may include a matrix or truss-like structure integrated into a burnable propellant grain.

According to an aspect of the disclosure, a rocket motor may include an ablative rigid structure that is integrated into a burnable propellant grain and configured to burn at a same rate or nearly a same rate as the burnable propellant grain.

According to an aspect of the disclosure, a gun-fired projectile assembly may include a projectile and a rocket motor that is attached to the projectile and includes a rigid stabilizing structure integrated into the burnable propellant grain of the rocket motor.

According to an aspect of the disclosure, a rocket motor may include a baffled end cap that covers a nozzle of the rocket motor.

According to an aspect of the disclosure, an end cap for a rocket motor nozzle may include a torturous or serpentine path for gas flow through the end cap.

According to an aspect of the disclosure, a rocket motor may include a discardable baffled end cap that is removably attached to the rocket motor.

According to an aspect of the disclosure, a gun-fired projectile assembly may include a projectile and a rocket motor that is attached to the projectile and includes a baffled end cap that covers a nozzle of the rocket motor to prevent particles of gas propellant from entering the rocket motor.

According to an aspect of the disclosure, a rocket motor may include a rigid stabilizing structure integrated into a burnable propellant grain and a baffled end cap that covers a nozzle of the rocket motor.

According to an aspect of the disclosure, a method of operating a rocket motor may include stabilizing a burnable propellant grain during burning using a rigid structure integrated into the burnable propellant grain.

According to an aspect of the disclosure, a method of operating a rocket motor may include baffling gas flow into a rocket motor using an end cap that defines a baffled flow path through the end cap.

According to an aspect of the disclosure, a rocket motor includes a burnable propellant grain, and a rigid structure integrated into the burnable propellant grain to stabilize the burnable propellant grain during burning.

According to an embodiment of any paragraph(s) of this summary, the rigid structure may be a matrix structure having a longitudinal axis that is aligned with a longitudinal axis of the burnable propellant grain.

According to an embodiment of any paragraph(s) of this summary, the rigid structure may be symmetrical.

According to an embodiment of any paragraph(s) of this summary, the rigid structure may be a honeycomb structure with cells oriented in a longitudinal axis of the rocket motor.

According to an embodiment of any paragraph(s) of this summary, the rigid structure may be cast or co-molded as part of the burnable propellant grain.

According to an embodiment of any paragraph(s) of this summary, the rigid structure may be flush with an aft face of the burnable propellant grain.

According to an embodiment of any paragraph(s) of this summary, the rigid structure may be formed of a material configured to burn at a burn rate that is approximately equal to a burn rate of the burnable propellant grain.

According to an embodiment of any paragraph(s) of this summary, the rigid structure may include channels or openings perpendicular to a longitudinal axis of the rocket motor.

According to an embodiment of any paragraph(s) of this summary, the rocket motor may include a nozzle, and an end cap that is arranged to cover the nozzle and defines a baffled path for gas flow through the end cap.

According to an embodiment of any paragraph(s) of this summary, the rocket motor may be arranged in a gun-fired projectile assembly, and the rigid structure may be configured to expose a face of the burnable propellant grain to gun gas when the rocket motor is gun fired.

According to another aspect of the disclosure, a rocket motor includes a nozzle, and an end cap that is arranged to cover the nozzle and defines a baffled path for gas flow through the end cap.

According to an embodiment of any paragraph(s) of this summary, the end cap may have a conical shape.

According to an embodiment of any paragraph(s) of this summary, the end cap may be removably attached to the rocket motor.

According to an embodiment of any paragraph(s) of this summary, the end cap may be removably attached to a projectile secured to the rocket motor.

According to an embodiment of any paragraph(s) of this summary, the end cap may have flexible tabs configured to provide a removable connection with the rocket motor.

According to an embodiment of any paragraph(s) of this summary, the baffled path may be defined by a plurality of through-holes formed in the end cap.

According to an embodiment of any paragraph(s) of this summary, a net cross-sectional area of the plurality of through-holes may be equal to or greater than a cross-sectional area of the nozzle.

According to an embodiment of any paragraph(s) of this summary, the rocket motor may be implemented in a gun-fired projectile assembly including a chamber containing a burnable propellant grain, wherein the nozzle is fluidly connected between the chamber and the rocket motor at an aft end of the rocket motor.

According to still another aspect of the disclosure, a method of operating a rocket motor includes integrating a rigid structure into a burnable propellant grain contained in the rocket motor, and stabilizing the burnable propellant grain during burning of the burnable propellant grain via the rigid structure.

According to an embodiment of any paragraph(s) of this summary, the method may include removably attaching an end cap defining a baffled path to cover a nozzle for the rocket motor, and baffling gas flow into the nozzle via the end cap.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

DETAILED DESCRIPTION

The principles described herein have application in defense applications, such as in a gun-fired projectile assembly that includes a rocket motor attached to the projectile. The projectile may be launched from a gun, such as a cannon or any other suitable artillery device. Fixed or semi-fixed ammunition applications that include a cartridge case may be suitable. Other suitable applications in which the ammunition is separately loaded may use a combustion chamber as the gun itself without a cartridge case. The rocket motor serves as a separate gas generation system for generating combustion gases that propel the projectile after the projectile is fired from the gun.

Figure 1:
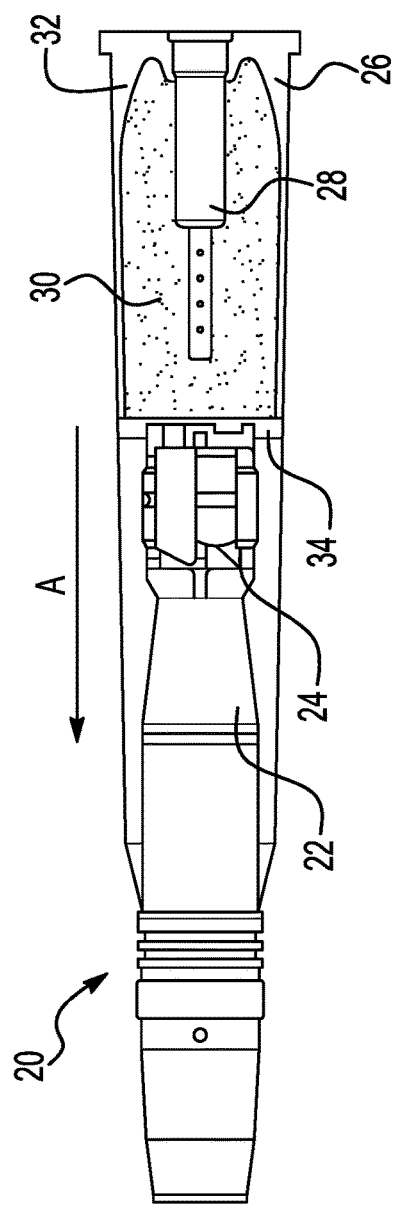
FIG. 1 shows a gun-fired projectile assembly including a rocket motor attached to a projectile that is fired from the gun-fired projectile assembly.

Referring first to FIG. 1, a gun-fired projectile assembly 20 that includes a rocket-assisted projectile is shown. The gun-fired projectile assembly 20, includes a rocket motor 22 that is secured to a projectile 24 to be fired from a cartridge case 26 of the gun-fired projectile assembly 20. The cartridge case 26 may be part of a fixed or semi-fixed cartridge. In other exemplary embodiments, the gun-fired projectile assembly 20 may include separately loaded ammunition that does not use a cartridge case. The rocket motor 22 is rigidly affixed to the projectile 24 such that the rocket motor 22 travels with the projectile 24. The cartridge case 26 of the gun-fired projectile assembly 20 may include an ignitor 28 for igniting a gun powder or propellant 30 contained in a chamber 32 of the cartridge case 26.

During handling of the gun-fired projectile assembly 20 and prior to firing, the gun propellant 30 may be separated from the projectile 24 by a barrier 34 formed of any suitable material. The barrier 34 may be formed of a foam material or any other ablative material that is consumed during burning of the gun propellant 30. Any suitable gun propellant may be used. The rocket motor 22 includes a solid propellant that is subsequently burned when the projectile 24 is fired for propelling the projectile 24. The rocket motor 22 may be configured such that the rocket motor propellant is exposed to the gun gas generated during burning of the gun propellant 30 and is thereby ignited. The rocket motor 22 and the projectile 24 are separated from the cartridge case 26 due to the high pressure generated in the gun-fired projectile assembly 20 during burning of the gun propellant 30. For example, the pressure may be up to 20,000 psi and the projectile 24 and rocket motor 22 may be accelerated through cartridge case 26 at an acceleration of approximately 15,000 g's.

Figure 2:
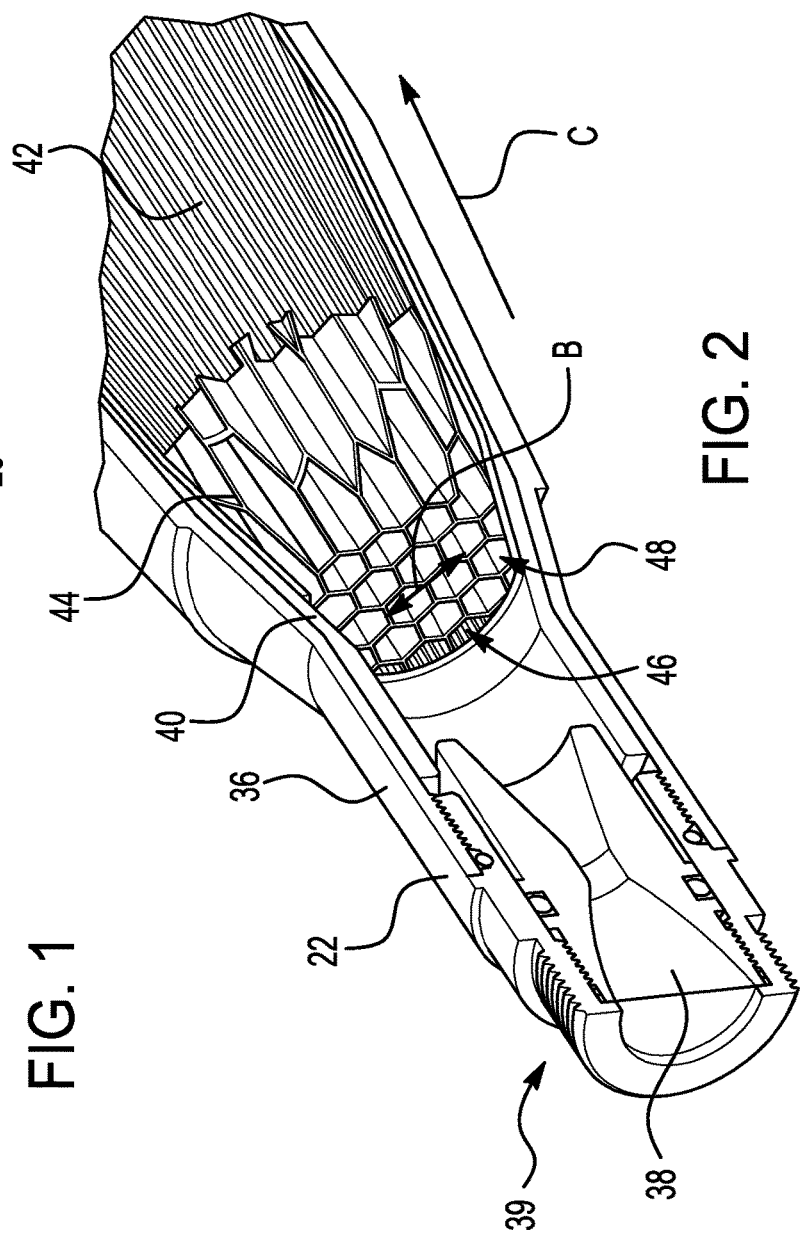
FIG. 2 shows a cross-sectional view of the rocket motor of FIG. 1 according to an exemplary embodiment in which the rocket motor includes a rigid structure integrated into a propellant grain of the rocket motor.

Referring in addition to FIG. 2, an exemplary embodiment of the rocket motor 22 is shown in which the propellant of the rocket motor 22 includes a stiffening structure to prevent fracture of the propellant during pressurization and acceleration of the rocket motor 22. The rocket motor 22 includes a rigid casing 36 that supports a nozzle 38 at an aft end 39 of the rocket motor 22. The aft end 39 of the rocket motor 22 is aft relative to a direction A in which the projectile 24 is fired from the gun-fired projectile assembly 20 (shown in FIG. 1). The casing 36 may be formed of any suitable material, such as a metal material. Steel may be suitable. A liner 40 may be molded into the metal of the casing 36 or bonded to the metal. The liner 40 may be formed of any suitable material, such as a rubber material. The rocket motor 22 contains a solid burnable propellant grain 42 that is burned during propulsion of the projectile 24 such that propulsion of the projectile 24 is assisted by the rocket motor 22. The burnable propellant grain 42 may be formed of any suitable propellant material. Ammonium perchlorate is an example of a suitable rocket motor propellant material.

A rigid structure 44 may be integrated into the burnable propellant grain 42 to stabilize the burnable propellant grain 42 during pressurization and acceleration of the gunfire event. The stabilization occurs when the high pressure or load is incurred on the burnable propellant grain 42, such as during an initial 10 to 15 milliseconds when the projectile 24 is fired and the burnable propellant grain 42 of the rocket motor 22 is initially ignited. The burnable propellant grain 42 is reinforced by the rigid structure 44 which is configured to still enable the exposure of the burnable propellant grain 42 to gun gas from the burning of the gun propellant 30 to enable ignition of the burnable propellant grain 42. The rigid structure 44 may be a matrix or truss-like structure having ribs that extend through a depth of the burnable propellant grain 42 in a depth direction C that is parallel to a longitudinal axis of the rocket motor 22. The longitudinal axis is parallel with the direction of travel A. The rigid structure 44 may incorporate further perforations in the radial direction B that will aid in the manufacture of the burnable propellant grain, and will aid in burning performance once ignited by equalizing the burn front across the cells of the matrix. Direction B is perpendicular to direction A and to the direction of travel.

Integrating the rigid structure 44 into the burnable propellant grain 42 is advantageous in stiffening the burnable propellant grain 42 during the rapid acceleration and high pressure of the rocket motor 22 and the projectile 24, by reducing the change in length of the burn surface of the propellant grain 42 during the gunfire event over the total length of the burn surface, i.e. the strain. Thus, the ability of the rubbery material of the burnable propellant grain 42 to strain to a point where the material breaks is limited by the rigid structure 44. The shape of the rigid structure 44 is formed to transmit stress deeper into the burnable propellant grain 42 as compared with the structure being formed only an outer surface of the burnable propellant grain 42. Accordingly, a peak stress at a face 46 of the burnable propellant grain 42 is reduced and thus the strain is reduced.

Forming the rigid structure 44 such that the grain face 46 is exposed to gas from the gun-fired projectile assembly 20, which enters the rocket motor 22 through the nozzle 38, is advantageous in that the rigid structure 44 may be easily implemented into existing rocket motor configurations. The rocket motor 22 may be configured to be open to pressure from the chamber 32 of the cartridge case 26 (shown in FIG. 1) and a flame front of the gun propellant 30. Consequently, the energy from firing the gun-fired projectile assembly 20 ignites the burnable propellant grain 42 without requiring an additional ignition mechanism for the burnable propellant grain 42. In exemplary embodiments, the rigid structure 44 may be flush with the aft grain face 46 of the burnable propellant grain 42.

The rigid structure 44 may have any suitable shape and may be symmetrical in shape to enable even stabilization and burning of the propellant grain 42. The ribs of the rigid structure 44 may be oriented or elongated to extend in a direction that is parallel with the direction C of gas flow into the rocket motor 22. Orienting the rigid structure 44 with the gas flow minimizes a loss of the burn surface area of the burnable propellant grain 42 and thus useable propellant. A length of the rocket motor 22 also extends in the direction C. The rigid structure 44 may extend along an entire length of the propellant grain 42 or a portion of the entire length of the propellant grain 42. In exemplary embodiments, the truss-like structure may be a honeycomb structure having a plurality of interconnected honeycomb substructures 48, as shown in FIG. 2. Other matrices, truss-like, or cellular structures may also be suitable. Any structure that enables exposure of the grain face is suitable. A bristle-like structure including a plurality of bristles that are connected may be suitable. The structure may be formed by 3D printing such that other complex, suitable structures may be implemented.

The material for the rigid structure 44 may be selected to be retained or ablated during burning of the burnable propellant grain 42. If the rigid structure 44 is to be retained, the rigid structure 44 may be formed of a durable metal having a high melting point or a phenolic material. Any non-burnable material may be suitable if the rigid structure 44 is to be retained. If the rigid structure 44 is to be ablated during burning of the burnable propellant grain 42, the rigid structure 44 may be formed of rigid materials that melt or burn at the burn temperature of the burnable propellant grain 42. For example, the rigid structure 44 may be formed of aluminum that is consumed in aluminized ammonium perchlorate propellant burn. Any rigid material that is burnable at a same or nearly same burn rate as the burnable propellant grain 42 may be suitable.

The rigid structure 44 may be cast, co-molded, or entrained as part of the burnable propellant grain 42. In an exemplary method, the liner 40 may be molded or bonded to the metal casing 36. When the molding is completed but still in a cure process, the burnable propellant grain 42 is co-molded into the molded structure. The rigid structure 44 may be inserted into the casing 36 prior to insertion of the burnable propellant grain 42. The entire structure may then be cured to form the final structure. The co-molding method may include pressing and cutting the rigid structure 44 to form the desired shape of the structure. Any other suitable manufacturing methods, such as additive manufacturing, or combinations of methods may be used to form the rocket motor 22 including the rigid structure 44.

Figure 3:
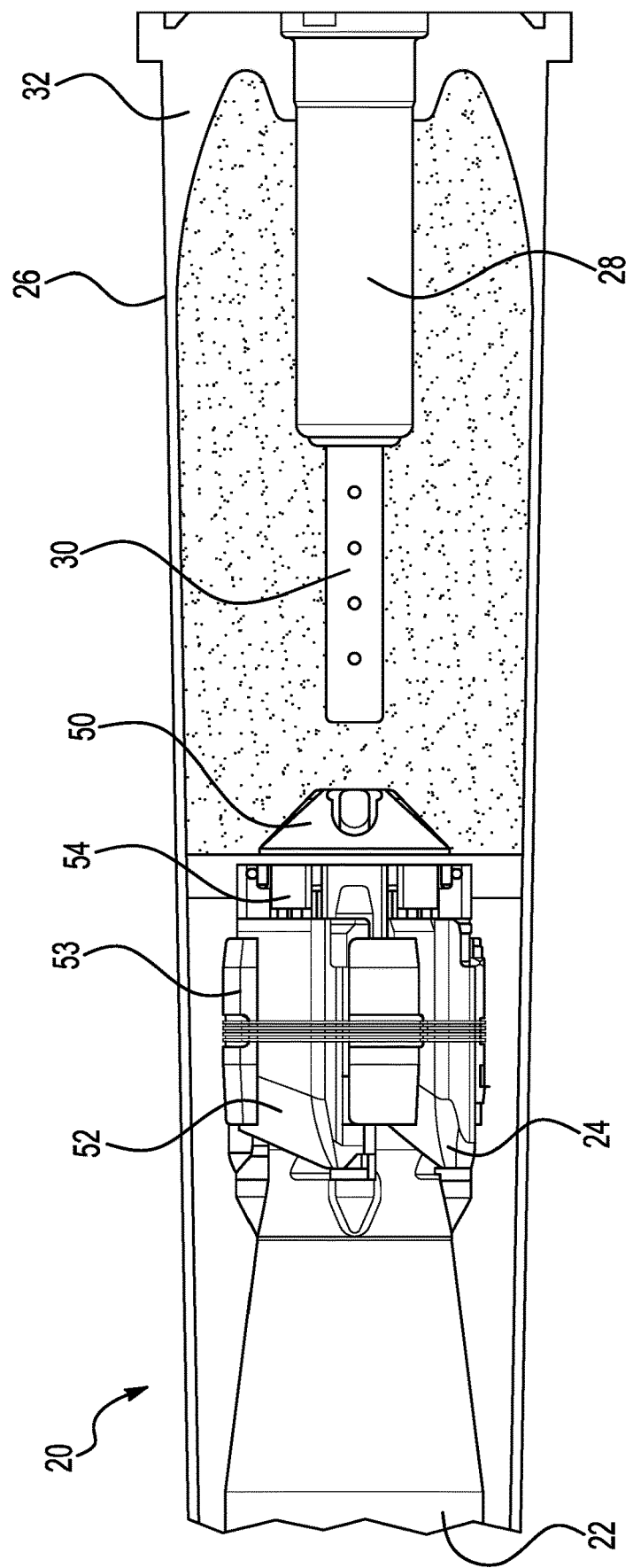
FIG. 3 shows a cross-sectional view of the gun-fired projectile assembly of FIG. 1 according to an exemplary embodiment in which the rocket motor includes a baffled end cap.

Referring now to FIG. 3, the gun-fired projectile assembly 20 may include a perforated end cap 50 that is arranged to cover the nozzle 38 of the rocket motor 22 (shown in FIG. 2). The end cap 50 defines a baffled path for gun gas flow through the end cap 50 into the rocket motor 22. The gun gas flow may flow from the cartridge case 26 in an embodiment in which the gun-fired projectile assembly 20 includes a cartridge case. In other embodiments in which the ammunition is separately loaded into the gun, the gun gas flow may flow from a combustion chamber of the gun itself. Using the end cap 50 is advantageous in protecting the rocket motor 22 from the pressure generated by the gun-fired projectile assembly 20. The rocket motor 22 may include the perforated end cap 50 in addition to the rigid structure 44 integrated in the burnable propellant grain 42 (shown in FIG. 2), or the rocket motor 22 may include the perforated end cap 50 without the rigid structure 44.

In conventional gun-fired projectile assemblies, gun gas dynamic pressure may induce damaging shock to the rocket motor 22. As the projectile 24 moves through the cartridge case 26, gun powder particles may move in the chamber 32 before all of the gun propellant 30 is burned such that particles from the gun propellant 30 may also pass through the nozzle 38. Either the shock or the particles entering the rocket motor may cause damage to the rocket motor 22. The end cap 50 is advantageous in eliminating a straight-line path from the gun propellant 30 through the nozzle 38 to the burnable propellant grain 42 of the rocket motor 22 (shown in FIG. 2), thereby dampening the gun gas and preventing particles of the gun propellant 30 from entering the nozzle 38. This prevents the damaging impact of powder grains on to the propellant grain 42 at high speed.

The end cap 50 may be attached to any component in the gun-fired projectile assembly 20, such as the projectile 24 having deployable wings or fins 52 and discarding guards 53, or the ignitor 28 of the cartridge case 26. Other components of the rocket motor 22 or the cartridge case 26 may also be configured to support the end cap 50. In an exemplary embodiment, the end cap 50 may be removably attached to a component such that the end cap 50 is discarded and ejected from the projectile 24 after the projectile 24 is fired from the gun-fired projectile assembly 20. The end cap 50 may be discarded when the projectile 24 is at muzzle exit.

Flexible tabs 54 may be formed integrally as part of the end cap 50 and extend outwardly to engage a component for at least temporarily securing the end cap 50 to a component during burning of the gun propellant 30. The flexible tabs 54 may be engageable with the projectile 24 and configured to deflect during firing of the projectile 24 for separation from the projectile 24 that enables the end cap 50 to be discarded. In other exemplary embodiments, the end cap 50 may be formed to remain attached to the rocket motor or the cartridge case 26 after firing. The end cap 50 that remains attached to the component, e.g. the projectile 24 or the ignitor 28, may be configured to deflect to a stowed position in the cartridge case 26 or in the projectile 24. For example, the end cap 50 may be formed as a sieve around the ignitor 28 to retain the gun propellant 30 in the chamber 32, such that the end cap 50 is retained in the chamber 32 after the projectile 24 is fired.

Figure 4:
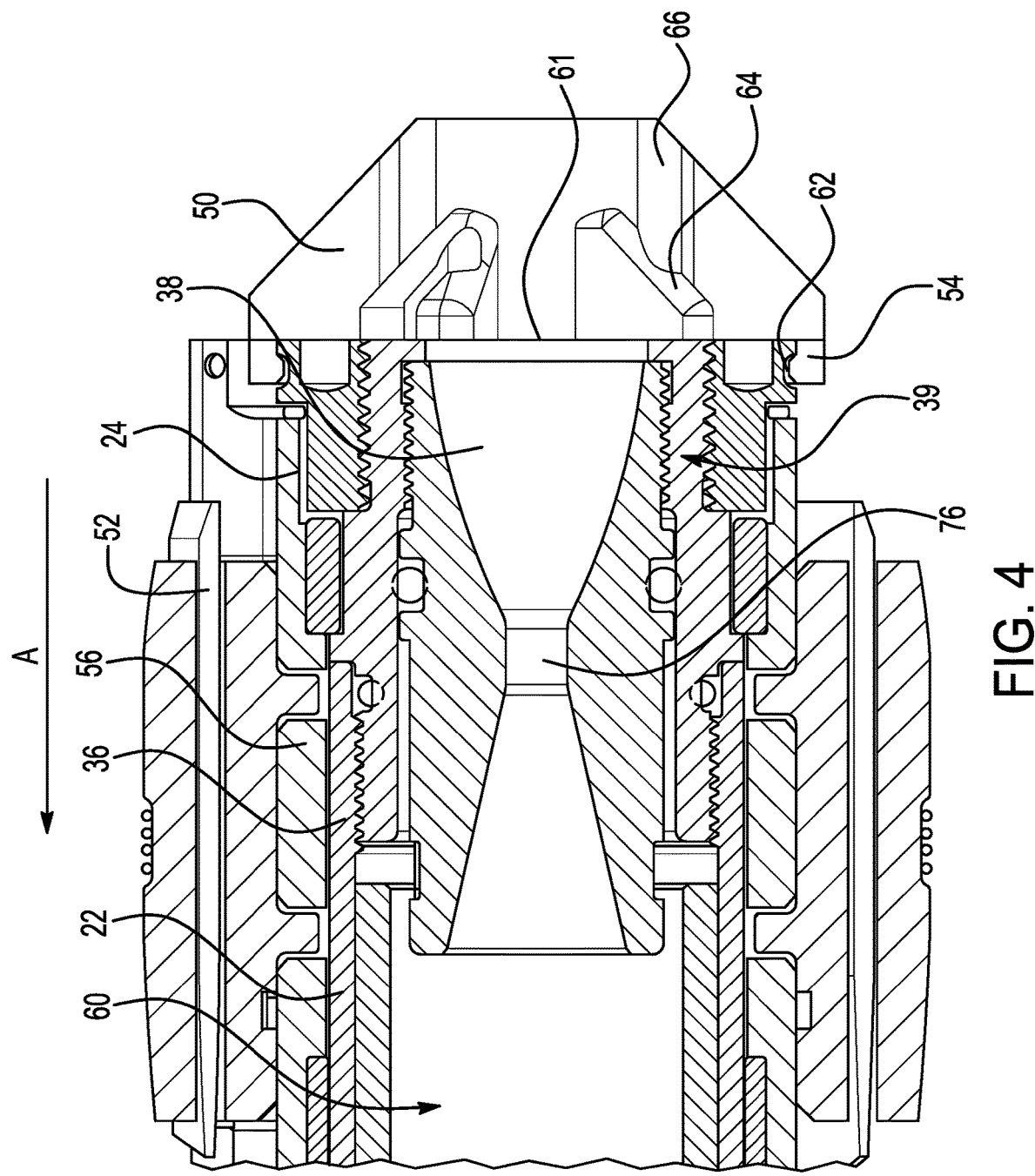
FIG. 4 shows a cross-sectional view of the rocket motor of FIG. 3 including the baffled end cap covering a nozzle of the rocket motor.
Figure 5:
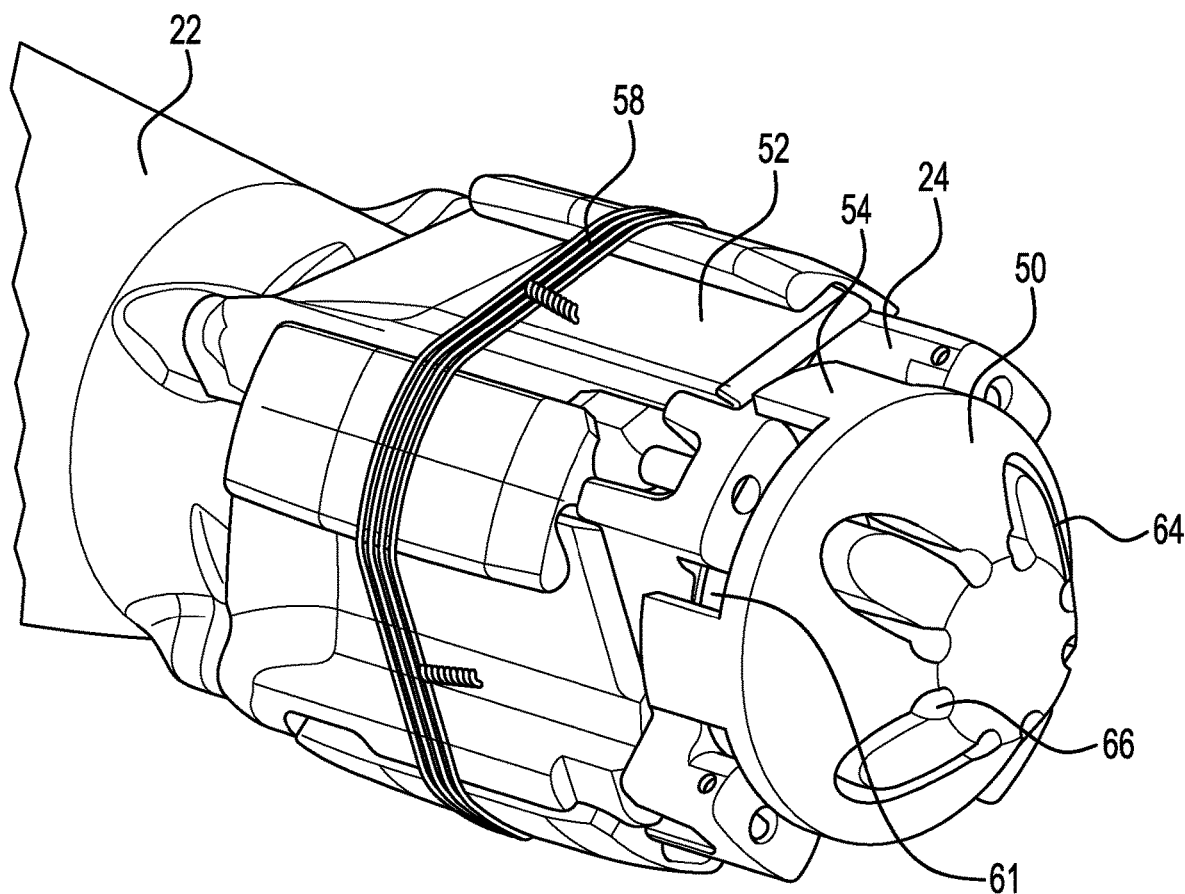
FIG. 5 shows the rocket motor of FIG. 3 including the baffled end cap attached to the projectile of the gun-fired projectile assembly.
Figure 6:
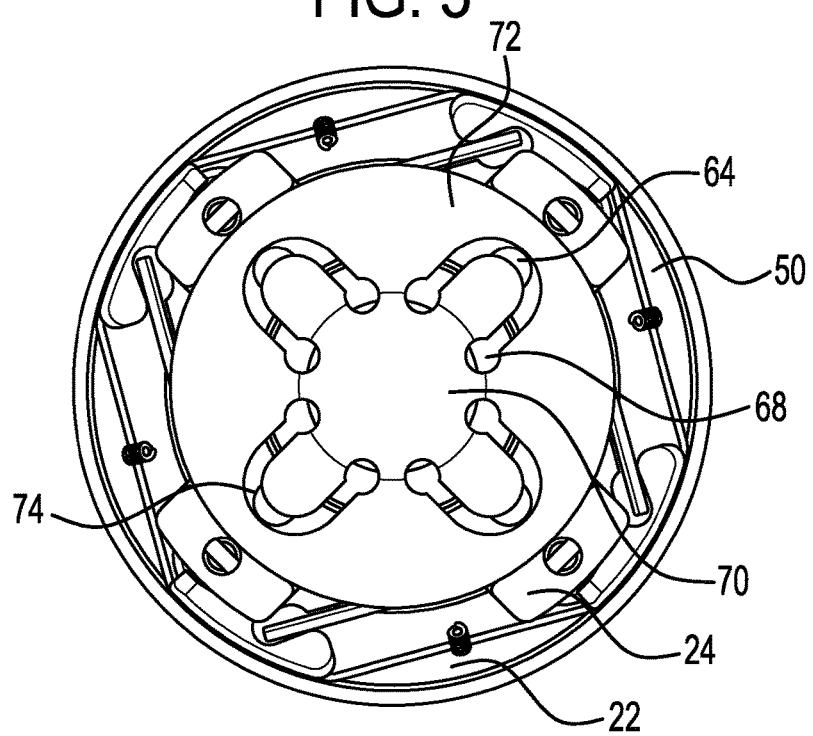
FIG. 6 shows a rear view of the rocket motor of FIG. 3 including the baffled end cap.
Figure 7:
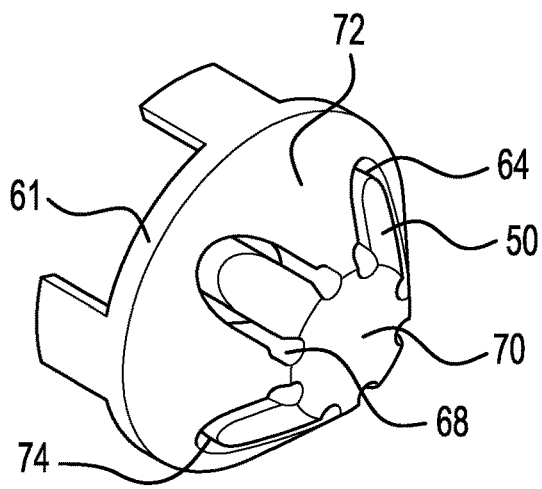
FIG. 7 shows an oblique view of the baffled end cap of FIG. 3.
Figure 8:
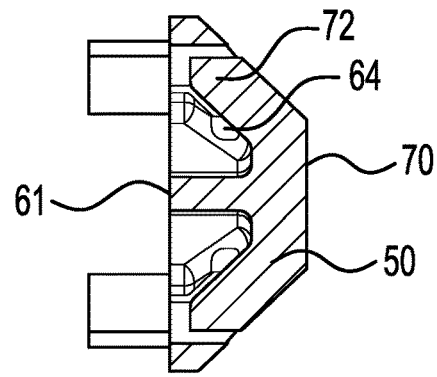
FIG. 8 shows a side cross-sectional view of the baffled end cap of FIG. 3.

Referring in addition to FIGS. 4 and 5, further details of the rocket motor 22 that is secured to the projectile 24 and includes the end cap 50 are shown. A main body 56 of the projectile 24 is secured to the casing 36 of the rocket motor 22. The fins 52 are held in a stowed position by a breakable wire or retaining band 58 until the projectile 24 reaches muzzle exit. The retaining band 58 may be broken by any suitable mechanism of the gun-fired projectile assembly such that the fins 52 are able to rotate away from the main body 56. The retaining band 58 may be broken in conjunction with the ejection of the end cap 50 from the projectile 24. The accelerations in the gun barrel put the entire projectile assembly into compression. When the projectile 24 leaves the muzzle, the projectile 24 reacts like a released spring and vibrates in every direction with a force approaching 8,000 g's. This force breaks the wires or retaining bands 58 and also expels discarding guards 53. The weight of the cap 50 then exceeds the retention force of the tabs 54 to expel the cap 50.

The end cap 50 is arranged proximate the nozzle 38 to cover an axial end of the nozzle 38. The nozzle 38 is arranged at the aft end 39 of the rocket motor 22 and extends toward a chamber 60 of the rocket motor 22 that contains the burnable propellant grain 42 (shown in FIG. 2). The end cap 50 extends axially outwardly from the aft end 39 of the rocket motor 22 in an opposite direction from the nozzle 38. An axial end 61 of the end cap 50 may extend adjacent to and parallel with an axial end of the nozzle 38 of the rocket motor 22. The axial end 61 may be defined by a radially outermost diameter of the end cap 50.

The flexible tabs 54 of the end cap 50 extend axially toward the rocket motor 22 and engage in a complementary groove 62 formed on the projectile 24. Other interlocking features may be formed on the end cap 50 and other components of the rocket motor 22 or gun-fired projectile assembly 20, such as the cartridge case 26. The end cap 50 may have any suitable shape and defines a torturous or baffled path 64 through the end cap 50. The baffled path 64 extends axially through an entire axial length of the end cap 50. Suitable shapes for the end cap 50 may include conical, frustoconical, semi-spherical, or rectangular. Many other shapes may be suitable.

The end cap 50 may be formed as a unitary component of any suitable material, such as a metal material. Other materials may also be suitable. In exemplary embodiments, only part of the end cap 50 may be formed of metal. For example, the flexible tabs 54 may be formed of a non-metal material or a different material than the rest of the end cap 50. The dimensions of the end cap 50 may be selected to fit within a profile of the projectile 24 such that the end cap 50 may be easily integrated into an existing projectile and rocket motor assembly. For example, the outermost diameter of the end cap 50 may be approximately the same or less than an outermost diameter of the projectile 24.

Referring in addition to FIGS. 6-10, the baffled path 64 of the end cap 50 is defined by a plurality of slots or through-holes 68 formed in the end cap 50. The baffled path 64 and through-holes 68 may have any suitable pattern. The pattern may be symmetrical to ensure even distribution of gas flow through the end cap 50. A net cross-sectional area of the plurality of through-holes 68 may be equal to or greater than a cross-sectional area of the nozzle 38 that faces the end cap 50. In an exemplary embodiment, the end cap 50 may include an axial end 70 that is formed as a planar surface that faces outwardly from the rocket motor 22 and the projectile 24 into the cartridge case 26 (shown in FIG. 3). The plurality of through-holes 68 may be formed at the edge of the axial end 70 between the planar surface of the axial end 70 and a tapering body 72 that tapers from the opposite axial end 61 toward the axial end 70.

The through-holes 68 may include curved or horse-shoe-shaped flow passages 74 that extend through the tapering body 72. The flow passages 74 are formed to have any non-straight and serpentine path for gas flow through the end cap 50. The gas flow is thus prevented from having a direct path through a throat 76 of the nozzle 38 (shown in FIG. 4). The flow passages 74 may be dimensioned to have a thickness that is less than the size of particles that may result from burning the gun propellant to prevent passage of the particles. The thickness of the flow passages 74 may be constant or varied throughout the end cap 50.

Figure 9:
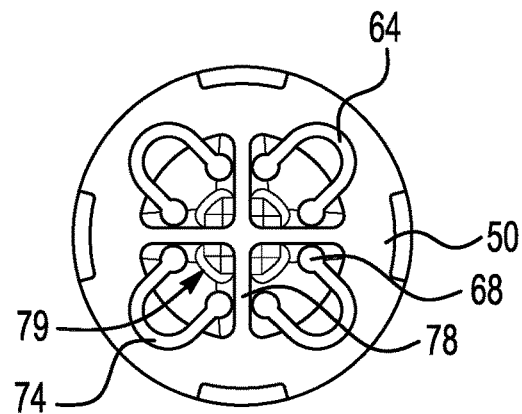
FIG. 9 shows a front cross-sectional view of the baffled end cap of FIG. 3.
Figure 10:
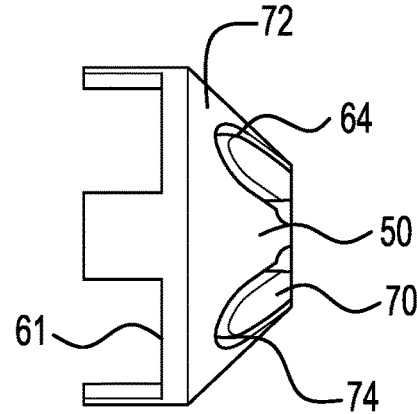
FIG. 10 shows a side view of the baffled end cap of FIG. 3.

Any number of through-holes 68 and flow passages 74 may be provided in the end cap 50. As shown in FIG. 9, the end cap 50 may include a bar structure 78 that separates quadrants 79 formed in the end cap 50. The bar structure 78 may be cross-shaped. Other support structures may be formed in the end cap 50 to support different flow passages 74. The end cap 50 may be formed using any suitable manufacturing processes, such as casting and machining, additive manufacturing methods, or any combination thereof.

Figure 11:
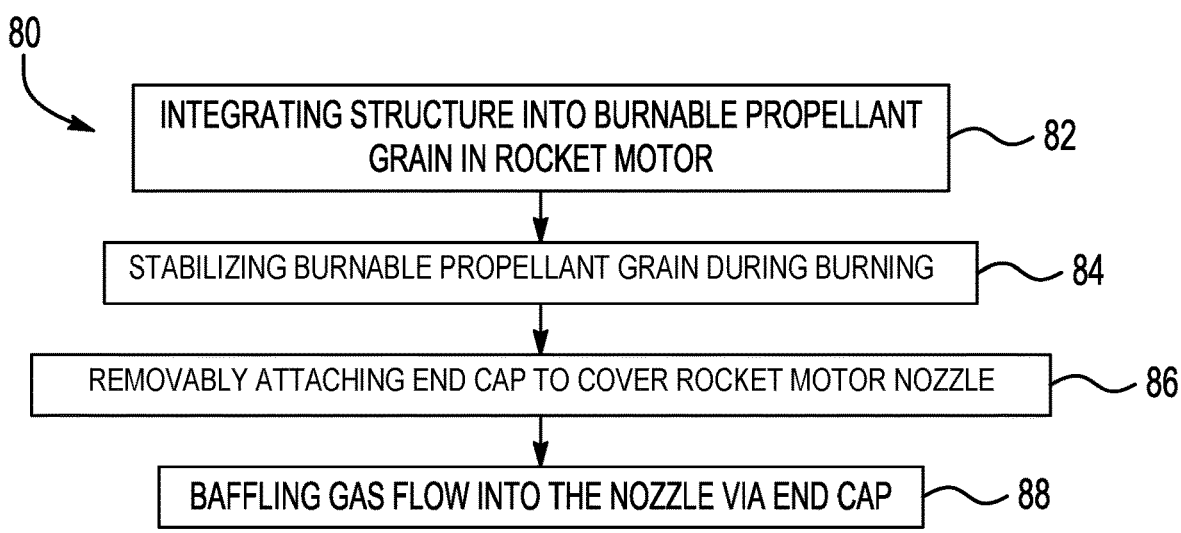
FIG. 11 shows a flowchart illustrating a method of operating a rocket motor, such as the rocket motor of FIG. 1.

Referring now to FIG. 11, a flowchart for a method 80 of operating a rocket motor is shown. The method 80 may include operating the rocket motor 22 including any of the features shown in FIGS. 1-10. Step 82 of the method 80 includes integrating a rigid structure 44 into a burnable propellant grain 42 contained in the rocket motor 22. Step 84 of the method 80 includes stabilizing the burnable propellant grain 42 during burning of the burnable propellant grain 42 via the rigid structure 44. Step 86 of the method 80 includes removably attaching an end cap 50 defining a baffled path 64 to cover a nozzle 38 for the rocket motor 22. Step 88 of the method 80 includes baffling gas flow into the nozzle 38 via the end cap 50.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A gun-fired projectile assembly comprising:
    a rocket motor that includes:
    a burnable propellant grain;
    a rigid structure integrated into an aft portion of the burnable propellant grain to stabilize the burnable propellant grain;
    wherein the rigid structure extends over only a portion of a length of the burnable propellant grain along a longitudinal axis of the burnable propellant grain, and transmits stresses from an aft face of the burnable propellant grain into an interior of the burnable propellant grain away from the aft face in a direction of the longitudinal axis of the burnable propellant grain; and
    wherein the rigid structure provides stiffness to the burnable propellant grain to reduce a change in length of the burnable propellant grain in the direction of the longitudinal axis of the burnable propellant grain during gun firing of the projectile assembly;
    a cartridge case coupled to an aft end of the rocket motor;
    wherein the cartridge case contains a gun propellant;
    wherein the rigid structure is configured to expose the aft face of the burnable propellant grain to gun gas from the gun propellant, when the rocket motor is gun fired; and
    wherein the rigid structure is a rigid matrix structure having a longitudinal axis that is aligned with the longitudinal axis of the burnable propellant grain;
    a nozzle; and
    an end cap that is arranged to cover the nozzle and defines a baffled path for gas flow through the end cap;
    wherein an outer diameter of the baffled path is equal to or greater than the outer diameter end of the nozzle.

2. The gun-fired projectile assembly according to claim 1, wherein the rigid structure is a honeycomb structure with cells oriented in the longitudinal axis of the burnable propellant grain.

3. The gun-fired projectile assembly according to claim 1, wherein the rigid structure is cast or co-molded as part of the burnable propellant grain.

4. The gun-fired projectile assembly according to claim 1, wherein the rigid structure is flush with the aft face of the burnable propellant grain.

5. The gun-fired projectile assembly according to claim 1, wherein the rigid structure is formed of a material configured to burn at a burn rate that is approximately equal to a burn rate of the burnable propellant grain.

6. The gun-fired projectile assembly according to claim 1, wherein the burnable propellant grain is a rubbery material that is less rigid than the rigid structure.

7. The gun-fired projectile assembly according to claim 1, wherein the rigid structure has ribs oriented in the longitudinal direction of the burnable propellant grain.

8. The gun-fired projectile assembly according to claim 1, wherein the gun propellant is in a chamber defined by the cartridge case.

9. The gun-fired projectile assembly according to claim 1, further comprising an ignitor in the cartridge case, the ignitor being operatively coupled to the gun propellant to ignite the gun propellant.

10. The gun-fired projectile assembly according to claim 1, wherein the end cap is between the nozzle and the gun propellant.

11. The gun-fired projectile assembly according to claim 10, wherein the baffled path is a non-straight and serpentine baffled path for gas flow through the end cap.

12. The gun-fired projectile assembly according to claim 10, wherein the end cap has a conical shape, with a wider end of the end cap covering the nozzle.

13. The gun-fired projectile assembly according to claim 1, wherein the end cap has flexible tabs configured to provide a removable connection with the rocket motor.

14. The gun-fired projectile assembly according to claim 1, wherein the baffled path is defined by a plurality of through-holes formed in the end cap.

15. The gun-fired projectile assembly according to claim 14, wherein a net cross-sectional area of the plurality of through-holes is equal to or greater than a cross-sectional area of the nozzle.

\* \* \* \* \*